United States Patent [19]

Ege

[11] Patent Number: 5,125,559

[45] Date of Patent: Jun. 30, 1992

[54] APPARATUS AND METHOD FOR BUTT-SPLICING METAL TAPES

[75] Inventor: Sigmund Ege, Olso, Norway

[73] Assignee: Kloften and Kloften (USA) Inc., Boynton Beach, Fla.

[21] Appl. No.: 668,879

[22] Filed: Mar. 13, 1991

Related U.S. Application Data

[63] Continuation-in-part of Ser. No. 585,965, Sep. 21, 1990, Pat. No. 5,062,566.

[51] Int. Cl.$^5$ .................. B23K 1/14; B23K 11/087
[52] U.S. Cl. .................................. 228/213; 228/216; 228/247; 228/5.7; 219/57; 219/85.14
[58] Field of Search ............... 228/212, 213, 216, 222, 228/244, 247, 5.7; 219/56, 57, 85.1, 85.14, 85.15, 85.21

[56] References Cited

U.S. PATENT DOCUMENTS

| | | | |
|---|---|---|---|
| 1,889,974 | 12/1932 | Chamberlain | 228/250 |
| 1,978,235 | 10/1934 | Summers | 228/250 |
| 2,206,375 | 7/1940 | Swift | 228/216 |
| 4,110,592 | 8/1978 | Ege | 228/250 |
| 4,563,563 | 1/1986 | Ege | 228/5.7 |

FOREIGN PATENT DOCUMENTS 1010955 11/1965 United Kingdom ............... 228/216

*Primary Examiner*—Samuel M. Heinrich
*Attorney, Agent, or Firm*—Victor F. Volk

[57] ABSTRACT

Means and method are presented for butt-splicing two metal tapes by confining molten solder between two carbon electrodes while the tape edges are moved together.

7 Claims, 3 Drawing Sheets

APPARATUS AND METHOD FOR BUTT-SPLICING METAL TAPES

This application is a continuation-in-part of application Ser. No. 07/585,965 filed Sep. 21, 1990, now U.S. Pat. No. 5,062,566.

BACKGROUND OF THE INVENTION

In my U.S. Pat. No. 4,110,592, the disclosures of which are incorporated herein by reference along with those of the parent application Ser. No. 585,965 and my U.S. Pat. No. 4563563, there is described a method of butt-splicing two copper tapes by passing a ribbon of silver solder over one edge and under the other, pressing them between carbon electrodes and fusing the solder. This method has been used commercially now for the intervening years and, for most purposes it is eminently satisfactory because there is very little build-up of solder on the surfaces of the tapes. But, for splicing the tapes of certain types of connector strip, no solder build-up at all is tolerable. The present apparatus and method make such splicing practicable.

SUMMARY OF THE INVENTION

In my new method the edges of two tapes to be connected are laid parallel upon the flat surface of a carbon electrode with a length of silver-solder wire between them thus forming a channel to confine the solder when it melts. Another carbon electrode is then pressed down upon the solder and tape edges so as to form a confining channel or open-ended box with the electrodes as the top and bottom surfaces and the tape edges as the side surfaces. This volume boxes in the solder when it melts or fuses. But, while the solder is still molten, I advance one of the tapes to lessen the gap between them to just that size needed to accommodate the quantity of solder in the wire.

For this purpose I have devised, for the advancing tape, novel stopping means that moves into position when the tape is first set up.

This new method and enabling apparatus provide a splice without any increase whatever of thickness due to a solder build-up and has the advantages, also, of allowing the use of solder in an economical round wire shape and avoiding solder wastage.

DETAILED DESCRIPTION OF A PREFERRED EMBODIMENT

Figure 1A:
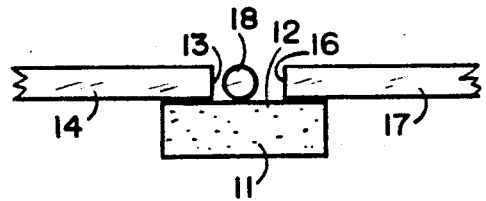
FIGS. 1a-1e show schematic views of the steps in the method of my invention.
Figure 1B:
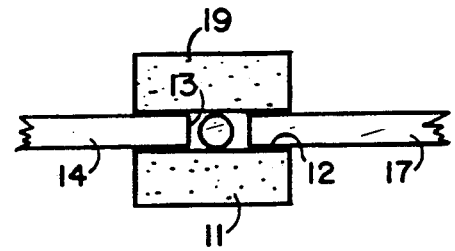
Figure 1C:
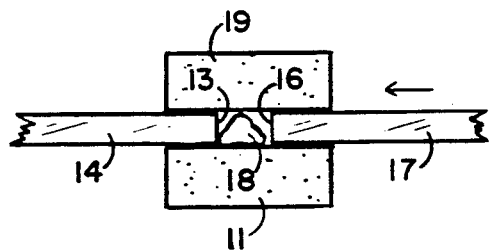
Figure 1D:
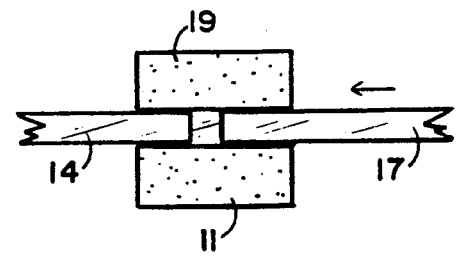
Figure 1E:
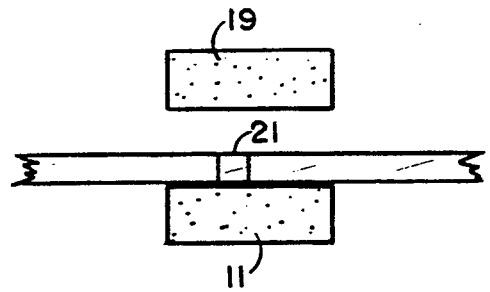

Referring first to the method of my invention and FIGS. 1a-1e, a carbon electrode 11 having an upper flat surface 12 supports an edge 13 of a copper alloy tape 14, a spaced apart parallel edge 16 of a tape 17, and a silver alloy solder wire 18 laid on the surface 12 between the two edges (FIG. 1a). A second carbon electrode 19 is then lowered over the two tapes and the solder (FIG. 1b). In the step of FIG. 1c current is passed between the two electrodes to start fusion of the solder while movement of the edge 16 toward the edge 13 is initiated. The movement is stopped when the fused solder occupies all the volume between the electrodes and the tape edges, and is permitted to cool. (FIG. 1d). The electrode 19 is raised to release a newly formed butt-spliced tape 21 (FIG. 1e). I have found, surprisingly, that splices formed by the described method are usually stronger than the tape itself. Indeed, this may be true even when the solder does not fill all of the space between the tapes so long as it bonds to a sufficient area of the edges. The important improvement resides in the avoidance, possible by this method, of overflow solder and any thickening of the tape. My apparatus to effect stoppage of the tape movement at the exact point will now be described.

Figure 2:
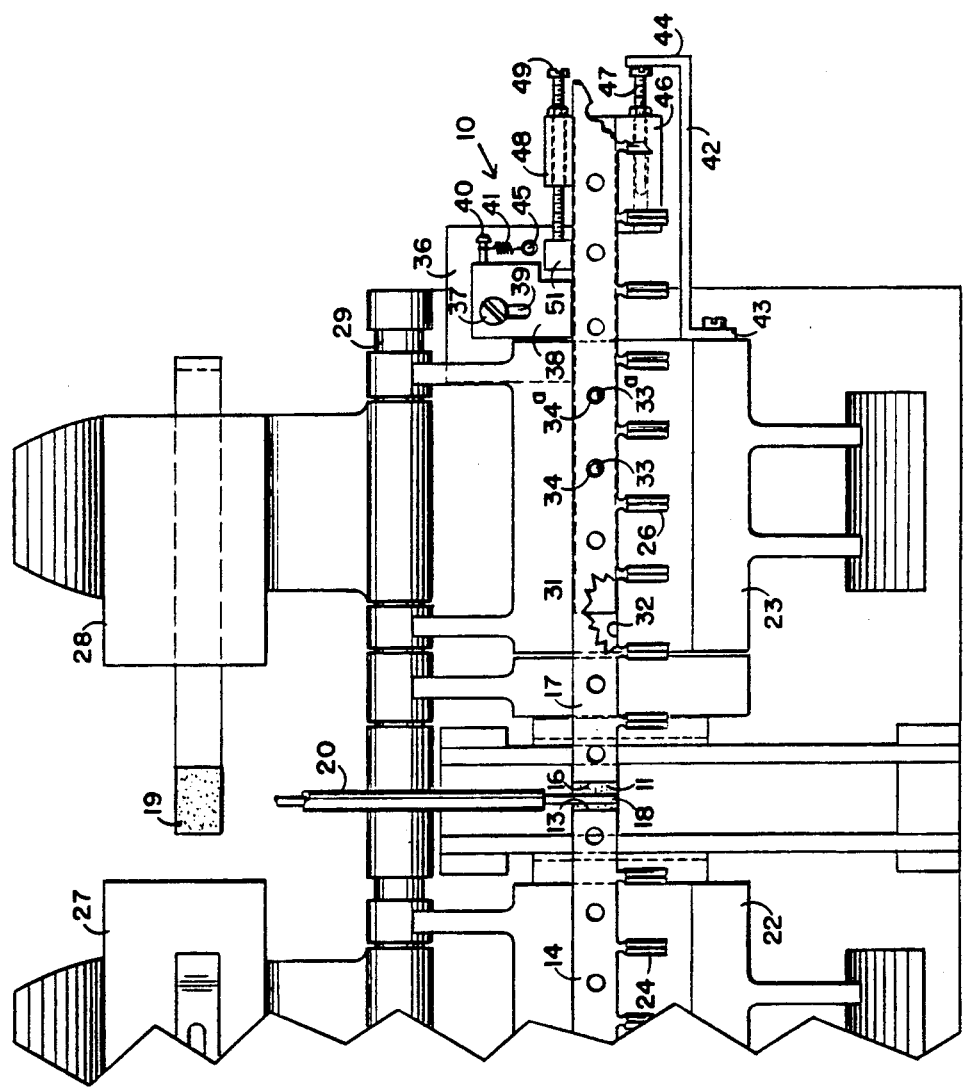
FIG. 2 shows a plan view of a grooved plate and guide bar used in the apparatus of my invention.
Figure 3:
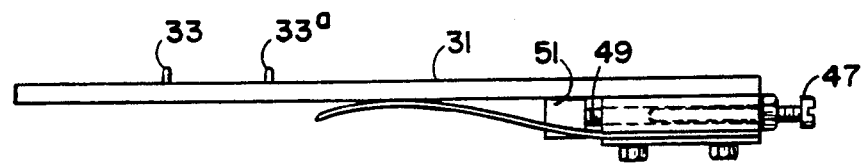
FIG. 3 shows a side view of a slide bar of my invention.
Figure 4:
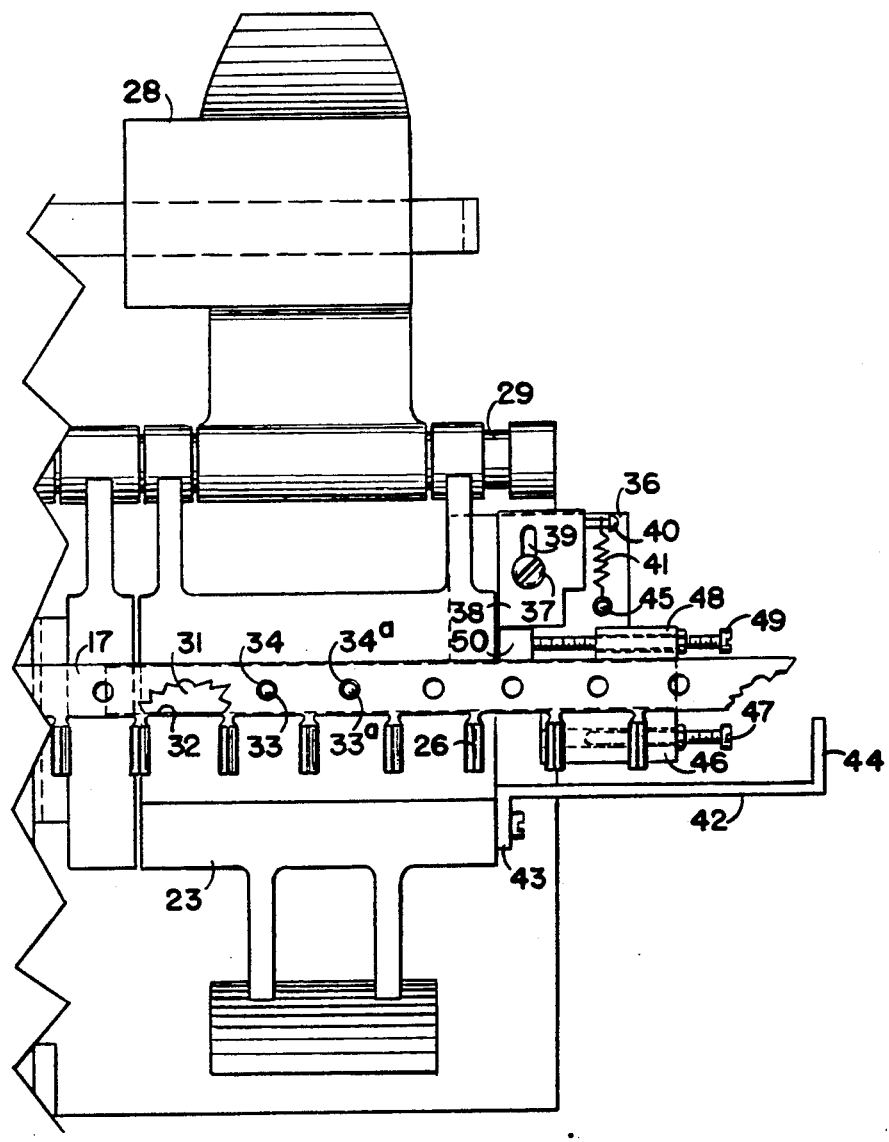
FIG. 4 shows a portion of FIG. 2 with the guide bar advanced to the left.

Referring to FIG. 2 my apparatus 10 with two grooved plates 22, 23 supports two connector strips 24, 26 comprising the respective tapes 14, 17 to be spliced. The edges 13, 16 of the tapes have been placed upon the fixed carbon electrode 11 which is connected from beneath to an electric cable (not shown). The left-hand plate 22 will be covered by a matching top plate 27 to clamp the connector strip 24 thereon while a top plate 28 which supports the upper carbon electrode 19 still remains raised. This plate 28 can be lowered by rotation around a rod 29 to bring the carbon electrode 19 (which is connected to an electric cable, not shown) directly over the electrode 11. A slide bar 31 (FIG. 3) fits into a groove 32 of the plate 23. The bar 31 comprises upwardly projecting pins 33, 33a that fit through holes 34, 34a that are two of a regular series of holes in the tape 17 whereby the position of the tape can be finely adjusted by moving the slide bar in its groove.

The underside of the plate 23 has a planar extension 36 with an upwardly extending bolt 37. The extension 36 supports a block 38 slidably guided thereon by the bolt 37 passing through a slot 39 in the block 38. A tension spring 41, connected to pegs 40, 45 projecting, respectively, from the block 38 and extension 36 urges the block to slide toward the bar 31. A sturdy flat rod 42 with oppositely directed end flanges 43 and 44 is bolted to the plate 23 so that the flange 44 can act as the stop that determines the first spacing of the edge 16 upon the electrode 11. This is accomplished by means of a threaded block 46 and bolt 47 attached to the slide bar 31 so that the bolt 47 will strike the flange 44 when the bar and carrier strip are moved to the right. Another threaded block 48 is attached to the opposite side of the slide bar 31. This block includes a bolt 49 that rotatably supports a square edged ferrule 51. The dimensions of the ferrule 51 are such that enable it to slide past the block 38 when the latter is withdrawn on the plate 36 against the spring 41. However, when the bar 31 is moved to the right enough for the bolt 47 to be stopped by the flange 44 the block 38 snaps forward and serves as a stop to establish the final position of the tape edge 16 when it is moved against the molten solder. The ferrule 51 then strikes against the block 38.

OPERATION

In the practice of my invention, the ends of the tapes 14, 16 having been accurately cut square in a known manner (U.S. Pat. No. 4,563,563), and the edge 13 of the tape 14 having been retracted to a position on the carbon electrode 11 and secured by the upper plate 27 and the edge 16 of the tape 17 also having been cut, the latter is retracted to the position reached by manually pressing the bolt 47 against the stop 44. This permits the spring 41 to move the block 38 forward where it will act as a stop when the bar 31 is again moved to the left. The plate 28 now is brought down upon the plate 23 thus bringing down the upper electrode 19 and, by known means, not shown, switching on the current between the two electrodes. The bar 31 is then immediately advanced to the left by hand while the solder is still molten until the ferrule 51 is stopped by the block 38. Pressure of the upper electrode upon the tapes insures a close fit between the edges 13, 16 and the flat surface 12 so that solder will not leak beneath the tapes. Consequently, when the edge 13 is advanced it forces the molten solder to rise in the channel formed by the surface 12 and edges 13, 16 until the edge surfaces have been wetted, the extent of the rise being precisely determined by the prepositioning of the ferrule 51. Although FIGS. 1a-1e show a solder wire 18 having a diameter about equal to the thickness of the tapes, so that very little movement of the edge 13 is required after the solder has fused, solder wires having diameters considerably smaller than the tape thickness are equally effective, since the molten solder will be forced upward to wet the tape edges. One solder size is thus capable of splicing tapes in a wide range of thicknesses.

In a few seconds, when the solder has hardened, the plates 27 and 28 are lifted from the connector strip which now forms a continuous length.

The foregoing description has been exemplary rather than definitive of my invention for which an award of Letters Patent is sought, as defined in the appended claims.

I claim:

1. An apparatus, comprising a small containment channel for butt-splicing together the short edges of two metallic tapes, comprising:
   (A) means supporting a lower carbon electrode comprising an essentially horizontal flat lower surface of said channel,
   (B) means supporting an upper carbon electrode comprising an essentially horizontal flat upper surface parallel to said lower surface,
   (C) means supporting a first of said tapes with one of its short edges between said upper and said lower surfaces, thereby comprising a side surface of said channel,
   (D) means slidably supporting a second of said tapes with one of its short edges between said upper and said lower surfaces, thereby comprising another side surface of said channel,
   (E) first stopping means for stopping said second of said tapes at a predetermined distance from said first of said tapes,
   (F) second stopping means for stopping said second of said tapes at a predetermined distance from said first of said tapes closer than that of said first stopping means,
   (G) means for injecting a length of solder wire into said channel upon said lower surface and between said edges,
   (H) means for passing electric current between said upper and lower electrodes thereby fusing solder to said edges,
   whereby said second tape can be advanced from a position determined by said first stopping means to a position determined by said second stopping means during said fusion.

2. The apparatus of claim 1 wherein said tapes comprise integrel elements projecting laterally therefrom.

3. The apparatus of claim 1 wherein said tape supporting means comprise guide plates comprising walls defining grooves therein and guide bars fitting said grooves, said stopping means being fitted on said guide plates.

4. The apparatus of claim 3 comprising spring means for automatically positioning said second stopping means.

5. The method of butt-splicing together metallic tapes comprising the steps of:
   (A) spacing apart in parallel the edges of two metal tapes upon a flat surface of a first carbon electrode along with the leading end of a continuous length of solder wire between said edges, said surface and said edges comprising a containment channel for said solder,
   (B) lowering a second carbon electrode upon said edges and said solder,
   (C) passing electric current into said electrodes to fuse said solder,
   (D) while said solder is liquefied, advancing one of said edges toward the other of said edges,
   (E) with said electrodes remaining in position, solidifying said solder and thereby splicing said tapes, and
   (F) separating said electrodes to remove the spliced tape.

6. The method of claim 5 wherein said tapes comprise mostly copper and said solder comprises mostly silver.

7. The method of claim 5 wherein said tapes are comprised in connector strip.

* * * * *